United States Patent
Yoshinari et al.

(10) Patent No.: US 6,540,397 B2
(45) Date of Patent: Apr. 1, 2003

(54) OPTICAL INFORMATION STORAGE MEDIUM

(75) Inventors: Jiro Yoshinari, Tokyo (JP); Takuya Tsukagoshi, Tokyo (JP); Hideki Hirata, Tokyo (JP); Naoki Hayashida, Tokyo (JP); Tokuyuki Honda, Mountain View, CA (US); Mark E. McDonald, Milpitas, CA (US); Michael V. Morelli, San Jose, CA (US); Andrew J. Daiber, Palo Alto, CA (US); Sanjoy Ghose, Scotts Valley, CA (US); Lambertus Hesselink, Atherton, CA (US); Shunichi Nishimura, Milpitas, CA (US); Sergei Sochava, Sunnyvale, CA (US)

(73) Assignees: Siro Technologies, Inc., San Jose, CA (US); TDK Corporation, Tokyo (JP)

( * ) Notice: Subject to any disclaimer, the term of this patent is extended or adjusted under 35 U.S.C. 154(b) by 0 days.

(21) Appl. No.: 09/828,693

(22) Filed: Apr. 5, 2001

(65) Prior Publication Data

US 2002/0041564 A1 Apr. 11, 2002

Related U.S. Application Data (63) Continuation-in-part of application No. 09/549,075, filed on Apr. 15, 2000.
(60) Provisional application No. 60/957,720, filed on Apr. 7, 2000.

(51) Int. Cl.[7] .............................................. G04B 37/00

(52) U.S. Cl. ..................... 368/286; 369/275.3; 369/284

(58) Field of Search ................................ 369/275.3, 94, 369/95, 124.03, 286, 284

(56) References Cited

U.S. PATENT DOCUMENTS

| | | | |
|---|---|---|---|
| 4,504,548 A | * | 3/1985 | Esho et al. .................. 428/426 |
| 4,578,788 A | * | 3/1986 | Ahn et al. .................... 369/275 |
| 4,783,386 A | * | 11/1988 | Nikles et al. .................. 430/19 |
| 4,908,813 A | * | 3/1990 | Ojima et al. .................. 369/94 |
| 5,089,358 A | * | 2/1992 | Taki et al. .................... 428/694 |
| 5,315,573 A | * | 5/1994 | Nakao et al. ................ 369/100 |
| 5,672,462 A | * | 9/1997 | Takuma et al. ......... 430/270.15 |
| 5,674,583 A | * | 10/1997 | Hakayama et al. ....... 369/94 X |
| 5,689,497 A | * | 11/1997 | Wilting et al. ............ 369/275.1 |
| 5,841,753 A | * | 11/1998 | Holtslag et al. ............... 369/94 |
| 5,878,022 A | * | 3/1999 | Okada et al. ............. 369/275.4 |
| 5,914,926 A | * | 6/1999 | Maeno et al. ............. 369/275.4 |
| 6,156,482 A | * | 12/2000 | Hamada et al. |

FOREIGN PATENT DOCUMENTS

| | | | |
|---|---|---|---|
| JP | 03088140 | * | 4/1991 |
| JP | 05225582 | * | 9/1993 |
| JP | 07014183 | * | 1/1995 |

* cited by examiner

Primary Examiner—Aristotelis M. Psitos
(74) Attorney, Agent, or Firm—Alan W. Cannon; Bozicevic, Field & Francis LLP (57) ABSTRACT

An optical information medium comprising at least two data layers for bearing recorded information, and a servo layer for bearing tracking servo, information which is independently formed from the data layers; wherein the medium is used with a recording or reading system wherein a data beam for recording or reading the data in the data layer and a servo beam for reading the tracking servo information in the servo layer are used, and the servo layer is read by the servo beam that had passed through the data layer; and a filter layer is disposed between the data layer and the servo layer, and the filter layer exhibits higher absorption to the data beam than to the servo beam.

10 Claims, 2 Drawing Sheets

OPTICAL INFORMATION STORAGE MEDIUM

RELATED APPLICATION DATA

This application is a continuation-in-part of U.S. application Ser. No. 09/549,075, filed on Apr. 15, 2000. This application is entitled to the benefit of U.S. Provisional Application No. 60/957,720 filed on Apr. 7, 2000.

FIELD OF THE INVENTION

This invention relates to a multi-layer information medium which has at least two data layers such as recording layer.

BACKGROUND OF THE INVENTION

There is a growing need for an optical disk having a higher density and a higher capacity. DVD (Digital Versatile Disk) is already commercially available, and the DVD has a storage capacity of about 4.7 GB per single side which is about 7 times larger than the compact disk. Technologies enabling further increase in the amount of information recorded are under active development.

Technologies that have been used for increasing the recording capacity of an optical disk include use of a recording/reading beam having a short wavelength, use of an objective lens having a higher NA (numerical aperture) in the optical system irradiating the recording/reading beam, increase in the number of recording layers, and multi-value recording. Among these, three-dimensional recording by increasing the number of recording layers enables remarkable increase in the recording capacity at low cost compared to the use of shorter wavelength or use of a lens with a higher NA. The three dimensional recording medium is described, for example, in Japanese Patent Application Kokai (JP-A) 198709/1997, and JP-A 255374/1996 discloses a medium wherein a rewritable information storage layer and a read only information storage layer are laminated.

In the reading of a multi-layer recording medium including a plurality of recording layers by using an optical pickup which irradiates a reading beam, the optical pickup receives the beam reflected from the recording layer on which the reading beam had focused, and in addition, the beam reflected from the recording layer(s) other than the recording layer to which the reading beam had focused. This results in the signal interference between the plurality of recording layers, and cross talk is induced. As a consequence, noise is introduced in the read out signal. The influence of the beam reflected from the recording layer other than the target recording layer reduces inversely with the square of the distance between the recording layers. Therefore, increase in the distance between the adjacent recording layers is effective in reducing the noise induced. For example, when the medium is used with an optical pickup having the structure normally employed in DVD and other conventional optical disks, the recording layers are disposed at a mutual distance of at least 30µ, and preferably at least 70µ to realize the signal quality of practically acceptable level. This corresponds the Examples of the JP-A 198709/1997 wherein a transparent resin layer of 100µ thick is provided between the recording layers, and the JP-A 255374/1996 wherein two adjacent information storage layers are disposed at a distance of 30µ or more.

However, when the distance between the adjacent recording layers is increased to as large as 30µ or more, limitation in the number of recording layers in the medium will be required to avoid excessive increase in the disk thickness, and the total storage capacity of the disk will also be limited.

The transparent resin layer provided between the recording layers is also associated with a difficulty. To be more specific, formation of a transparent resin layer with a consistent thickness is difficult in spite of various attempts in forming the transparent resin layer by spin coating, resin sheet disposition and the like when the transparent resin layer formed is as thick as, for example, 30µ or more, and in particular, 70µ or more. The thick resin layer also suffers from increased internal stress and the medium is subject to warping. As a consequence, reliable provision with the optical disk of the required mechanical precision has been difficult.

In the case of the medium having a single recording layer formed on a substrate, the shape of the grooves (guide grooves) formed in the resin substrate will be transferred to the recording layer. In contrast, in the case of a medium wherein two or more recording layers are formed on the substrate with an intervening relatively thick transparent layer between the recording layers, it is quite difficult to transfer the shape of be grooves formed in the substrate to all of the recordig layers since the groove depth is about 100 nm at most for optical reasons while the distance between the recording layers is at least 30µ as described above. As a consequence, formation of the grooves in the transparent resin layer by photopolymerization (2P) process will be required as described, for example, in the JP-A 198709/1997 and eminent increase in the production cost is invited.

An object of the present invention is to realize a highly accurate tracking servo with no increase in the production cost in a multi-layer information medium wherein a plurality of data layers such as recording layers are disposed. Another object of the present invention is to suppress the cross talk associated with the decrease in the distance between the data layers.

SUMMARY OF THE INVENTION

Such objects are attained by the present invention. The invention comprises, in general terms, an optical information medium comprising at least two data layers for bearing recorded information, and a servo layer for bearing tracking servo information which is independently formed from the data layers; wherein the medium is used with a recording or reading system wherein a data beam for recording or reading the data in the data layer and a servo beam for reading the tracking servo information in the servo layer are used, and the servo layer is read by the servo beam that had passed through the data layer; and a filter layer is disposed between the data layer and the servo layer, and the filter layer exhibits higher absorption to the data beam than to the servo beam.

In one embodiment of the invention, the filter layer. exhibits an absorption of at least 80% to said data beam and an absorption of up to 20% to said servo beam. The filter layer may comprise a resin layer formed by UV curing a composition containing a UV-curable composition and a photoinitiator. The filter layer may contain a dye.

The optical information medium typically comprises at least two data layers for bearing recorded information, and a servo layer for bearing tracking servo information which is independently formed from said data layers, wherein the medium is used with a recording or reading system wherein a data beam for recording or reading the data in the data layer and a servo beam for reading the tracking servo information in the servo layer are used, and the servo layer is read by the servo beam that had passed through the data layer, and the servo layer exhibits lower reflectivity to the data beam than to servo beam.

The servo layer may comprise a metal or a semimetal. The data layer may be a flat layer, and the servo layer may be a layer formed with surface projections and depressions for bearing the tracking servo information. The data layer may be readable by using a confocal optical system.

In the present invention, the data layers are separately formed from the servo layer, and there is no need to form the tracking servo pattern on each data layer. Therefore, the data layer can be formed as a smooth layer, and highly accurate tracking servo is enabled with no increase in the production cost of the medium. Formation of the smooth data layer also results in the merits as described above. In the present invention, a filter layer is disposed between the data layer and the servo layer, and adverse effects on the tracking servo induced by the data beam reflected from the servo layer is thereby avoided.

BRIEF DESCRIPTIONS OF THE DRAWINGS

The invention will be more fully understood by reference to the following drawings, which are for illustrative purposes only.

DETAILED DESCRIPTION OF THE INVENTION

In the present invention, a "data layer" is the layer wherein record marks and pits carrying the recorded information are present, and "a servo layer" is the layer formed with a tracking servo pattern comprising projections and depressions such as grooves and pits. In the present invention, the term "information-bearing layer" may be used to designate both the data layer and the servo layer. The "optical information medium" of the present invention includes both an optical recording medium and a read only medium. The data layer of an optical recording medium at least includes a recording layer. In the case of a read only medium, data-bearing pits or record marks are preliminarily formed in the data layer.

In the present invention, the beam used in the reading of the data layer and the recording of the data layer is designated "data beam" and the beam used in the reading of the servo layer is designated "servo beam". The "recording/reading beam" of the present invention is a concept including the data beam and the servo beam.

The "multi-layer information medium" of the present invention is a medium comprising a plurality of information-bearing layers, and wherein the recording or the reading of an information-bearing layer is conducted by the recording/reading beam which has passed through other information-bearing layer(s).

Figure 1:
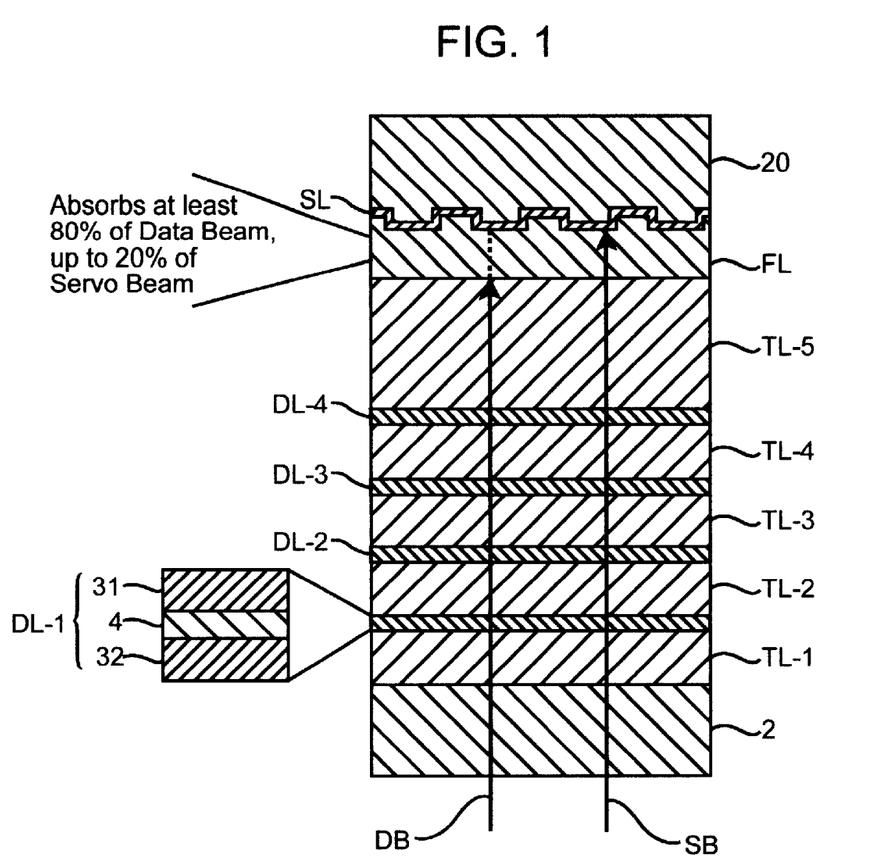
FIG. 1 is a partial cross-sectional view showing an embodiment of the optical information medium according to the present invention.

An embodiment of the multi-layer information medium to which the present transparent layers TL-1 to TL-5 are disposed on the substrate 2, and four data layers DL-1 to DL-4 are disposed between the adjacent transparent layers. On the transparent layer TL-5 is formed a filter layer FL, a servo layer SL, and a servo substrate 20 in this order. The servo substrate 20 is formed with a tracking servo pattern comprising grooves and/or pits, and on the surface on the side of the recording/reading beam incidence of this servo substrate 20 is formed a reflective layer which functions as the servo layer SL.

The data layers and the servo layer are independently formed in the present invention because of the difficulty in forming the tracking servo pattern on each of the two or more data layers, and in particular, on each of the three or more data layers at a high accuracy. In addition, if a servo layer SL is formed independently from the data layer, there will be no need to form the tracking servo pattern on the data layers, and formation of the data layers as a smooth layer will be enabled. Then, the production cost will be reduced since there is no need to provide the tracking servo pattern on each of the multiple data layers by 2P (photopolymerization) process as described above. Furthermore, when the data layer formed is a smooth layer, the data layer DL will exhibit an increased reflectivity, and no interference will be induced by the steps of the tracking servo pattern. Generation of the noise due to irregularity such as deformation of the tracking servo pattern such as winding of the groove will also be avoided.

In the recording or the reading of the medium shown in FIG. 1, the servo layer SL is read with or addressed by the servo beam having a wavelength different from that of the data beam. The data beam and the servo beam are irradiated from the bottom side of the medium in FIG. 1, and therefore, the servo beam reaches the servo layer after passing through the data layer.

In the present invention wherein a plurality of data layers are disposed, the distance between the adjacent data layers is preferably reduced. Such reduction in the distance between the data layers, however, is associated with the problem of cross talk by the light reflected from other data layers. In view of such situation, it is preferable in the present invention to use an optical pickup equipped with a confocal optical system which utilizes the principle of a confocal microscope for the reading of each data layer. An optical pickup equipped with a confocal optical system has a very high resolution in the thickness direction of the medium, and cross talk between the data layers can be greatly reduced. Confocal optical systems which may be used in the reading of a multi-layer information medium are described, for example, in JP-A 222856/1998 and ISOM '94 Technical digest (1994) 19.

Figure 2:
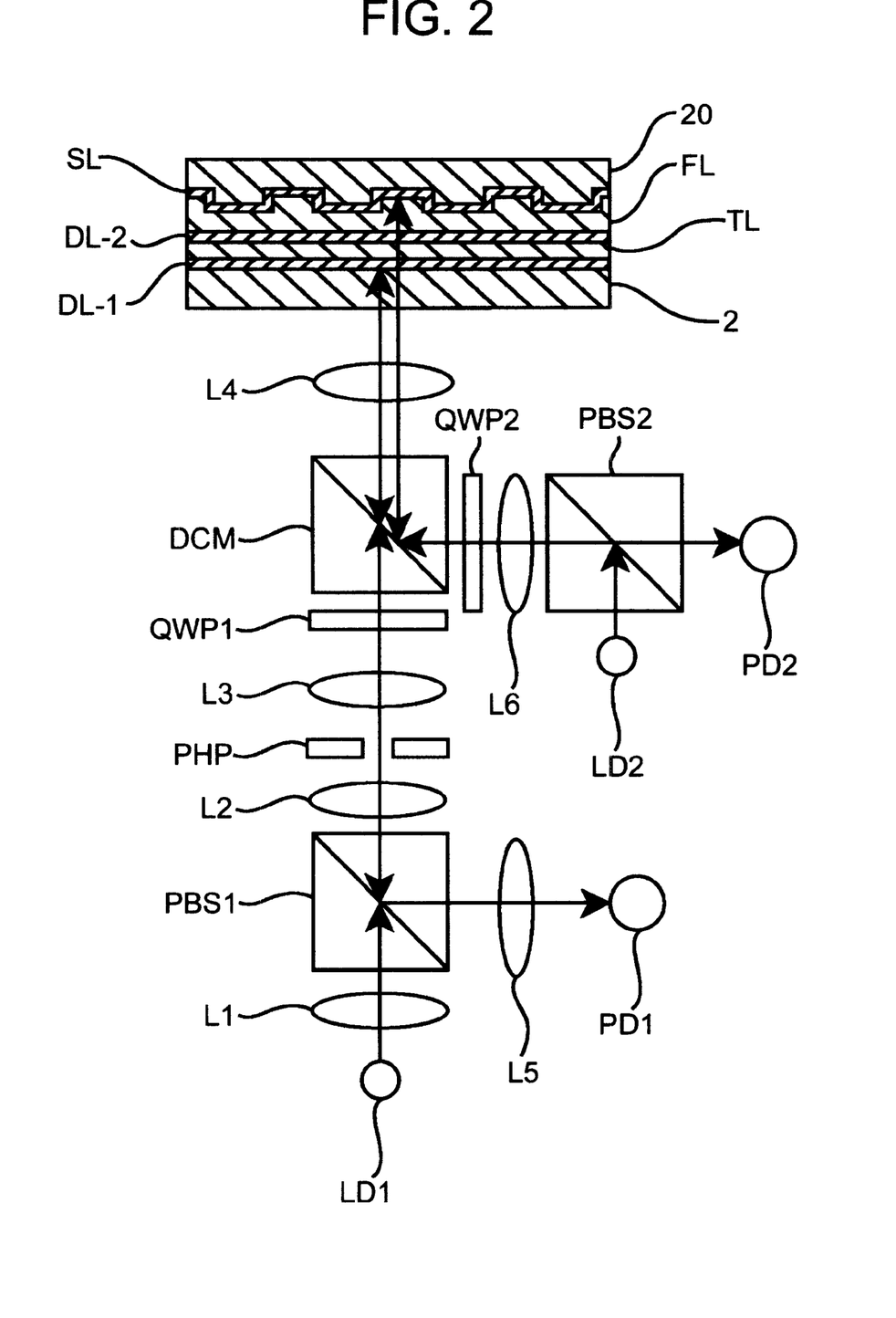
FIG. 2 is a view showing an embodiment of the optical pickup used for recording and reading of the optical information medium according to the present invention.

An embodiment of the optical pickup which is equipped with a confocal optical system and which can be used in the recording and reading of a multi-layer information medium is shown in FIG. 2 together with the medium. The medium shown in FIG. 2 has a structure comprising a substrate 2, and a data layer DL-1, a transparent layer TL, a data layer DL-2, a filter layer FL, a servo layer SL, and a servo substrate 20 disposed on the substrate 2 in this order.

In this optical pickup, the data beam which addresses the data layers is emitted from a laser diode LD1. The data beam then goes through a lens L1 to become collimated, and after going through a polarizing beam splitter PBS1, the beam is focused by lens L2. A pin-hole plate PHP formed with a pin hole is arranged at the focal point, and the data beam which passes through the pin hole is collimated by lens L3, and after passing through quarter-wave plate QWP1 and dichroic mirror DCM which is transparent to the data beam, the beam enters objective lens L4 to be focused at the data layer DL-1 on the lower side of the multi-layer information medium. The data beam reflected by the data layer DL-1 goes back along the same pathway as the incidence into the medium, and the beam is then reflected by the polarizing beam splitter PBS1 to be focused by a lens L5 to a photodetector PD 1. The focus servo to the data layer DL-1, or the focus servo and detection of the read-out signal is thereby accomplished.

The data beam also reaches the data layer DL-2 after passing through the data layer DL-1 the data of which is to be read, and a light is also reflected from the data layer DL-2 back to the optical pickup. This data beam, however, is out of focus at the data layer DL-2, and the light reflected from the data layer DL-2 is not focused to the pinhole position of the pinhole plate PHP. The beam which is unfocused at the pinhole is substantially blocked by the pinhole plate PHP. The cross talk between the data layers is thereby suppressed by the optical pickup equipped with the confocal optical system.

In the meanwhile, the servo beam is irradiated from a laser diode LD2. The beam is then reflected by a polarizing beam splitter PBS 2, and goes through a lens L6 and a quarter-wave plate QWP2 to be reflected by a dichroic mirror DCM. The beam then enters the objective lens L4 and become focused on the servo layer SL. The servo beam is then reflected by the servo layer SL to go back along the same pathway as its incidence into the medium, and the beam passes through the polarizing beam splitter PBS 2 to be focused on a photodetector PD2. The tracking servo and the focus servo to the servo layer are thereby accomplished.

When the recording is accomplished by using such optical pickup, the data layer should be irradiated with the recording beam, namely, with a data beam of high intensity. Servo tracking using the light reflected from the servo layer is also conducted during the recording, and if the data beam of high intensity is directed to a medium having a transparent layer instead of the filter layer FL, the data beam will pass through the data layer to reach the servo layer, and a part of the data beam reflected therefrom will reach the dichroic mirror DCM. In spite of the spectral characteristics of the dichroic mirror DCM that the servo beam is reflected whereas the data beam is allowed to pass therethrough, the data beam will not fully pass through the dichroic mirror DCM, and a part of the data beam will be reflected by the dichroic mirror DCM. As a consequence, the data beam will partly reach the photodetector PD2 provided for the servo purpose and the tracking servo will be adversely affected. In view of the high intensity of the recording data beam, the influence on the tracking servo is not negligible even if the reflection by the dichroic mirror DCM was only partial. The reading data beam of low intensity is also associated with the same problem since a part of the reading data beam may reach the photodetector PD2 provided for the servo purpose to adversely affect-the tracking servo.

In view of such situation, a filter layer FL is provided in the present invention between the servo layer SL and the adjacent data layer (DL-4 in FIG. 1, and DL-2 in FIG. 2), and this filter layer exhibits higher absorption of the data beam compared to the absorption of the servo beam. The data beam is considerably attenuated on the way and back through the filter layer FL, and the adverse effects on the tracking servo caused by the data beam are thereby greatly suppressed.

The constitution of various parts of the optical recording medium of the present invention is described in detail as follows.

Filter Layer

The filter layer is a layer which exhibits higher absorption of the data beam compared to the absorption of the servo beam. To be more specific, the filter layer preferably exhibits an absorption of the data beam of about 80% or more, and more preferably, at least 90%. When the absorption is too low, the merits of the present invention will not be sufficiently realized. On the other hand, the filter layer preferably exhibits an absorption of the servo beam of less than about 20%, and more preferably, less than about 10%. When the absorption is too high, reading of the servo layer by the servo beam entering through the filter layer will be difficult to detract from the tracking servo. Thus, the filter layer is configured to selectively absorb light at the data beam wavelength, and to selectively pass light at the servo beam wavelength.

The material used for the filter layer is not particularly limited, and an adequate material may be selected from the materials exhibiting the desired spectral absorption characteristics, for example, from the dyes comprising an organic material or an inorganic material. Use of an organic dye is preferable, and use of an organic dye further comprising a resin is more preferable. Exemplary preferable resin is a resin cured by UV or other active energy ray. Formation of the filter layer is facilitated by such admixture of the resin component compared to the use of the dye alone. For example, a uniform, relatively thick filter layer can be formed in a short period when a mixture of a UV-curable composition an a dye is spin coated and UV cured.

The dye used for the filter layer is not particularly limited, and an adequate dye may be selected from the dyes exhibiting the desired spectral absorption characteristics, for example, from cyanine, phthalocyanine, and azo organic dyes. The dye may be modified as desired, for example, by introducing a substituent in the side chain of the dye in consideration of the compatibility with the resin. The filter layer may also be constituted from two or more dye layers each having different spectral absorption characteristics for ease of controlling the spectral absorption characteristics.

When the filter layer contains a dye and a resin, the dye is not limited for its content, and the content may be determined depending on the type of the resin employed and to satisfy the required spectral absorption characteristics. The content is typically 1 to 10 mass %. An excessively low dye content is undesirable since increase in the thickness of the filter layer is required. On the other hand, excessively large content-will result in the shortening of the pot life.

When the wavelength of the beam to be absorbed is relatively short, and to be more specific, when steep absorption is to be realized in the wavelength region of up to 450 nm, the filter layer may be constituted from a UV-curable resin layer free from the dye. The UV-curable resin layer may be formed by coating a composition containing a UV-curable composition and a photoinitiator, and UV curing the coated film. The photoinitiator exhibits high absorption near the wavelength of the light beam used for the curing, and the thus cured film also exhibits high absorption near such wavelength. This is believed to be due to the condition that the photoinitiator is not completely decomposed in the course of curing and a part of the photoinitiator remains in intact or modified state after the curing. As a consequence, such layer can be used as a filter layer which exhibits selectively high absorption at the short wavelength region.

The photoinitiator used in the filter layer is not particularly limited, and an adequate photoinitiator may be selected from conventional photoinitiators such as benzoates, benzophenone derivatives, benzoin derivatives, thioxanthone derivatives, acetophenone derivatives, propiophenone derivatives, and benzyls depending on the wavelength of beam to be absorbed.

The thickness of the filter layer may be adequately determined to satisfy the required spectral absorption characteristics. However, the filter layer containing a resin wherein a dye or a photoinitiator is used for the absorption material is preferably formed to a thickness in the range of 1 to 30μ. When the filter layer is too thin, sufficient absorption characteristics is less likely to be obtained. When the filter layer is too thick, number of the data layers included in the medium will be limited in view of the total thickness of the medium and this is not preferable.

When the wavelength of the beam to be absorbed is relatively short, for example, up to 450 nm, a metal layer containing at least one metal (including semimetal) element may be used for the filter layer. Some metals including gold exhibit steep high absorption in the short wavelength region. In view of such situation, the type of the metal included and the thickness of the filter layer may be selected so that sufficient absorption and sufficient transmittance are reliably achieved at the target wavelength regions of absorption and transmittance, respectively. Examples of the metals which may be preferably used in the filter layer include Au, Pt, Cu and the like. The filter layer may also comprise two or more different metal layers each having different spectral absorption characteristics.

The thickness of the metal layer used as the filter layer may vary by the type of the metal used. However, the thickness of such layer is preferably in the range of 10 to 200 nm, and more preferably 20 to 100 nm. When the metal layer is too thin, the layer will fail to exhibit sufficient absorption at the target absorption wavelength region while excessively thick metal layer results in an insufficient transmittance at the target transmittance wavelength region.

The filter layer may also comprise an interference filter. Exemplary interference filters which may be used include a dielectric multi-layer film and a dielectric film sandwiched between two metal thin films comprising Ag or the like.

It should also be noted that, in the medium shown in FIG. 1, the reflective layer (servo layer SL) formed on the servo substrate 20 can be used instead of providing the filter layer FL. In this case, the servo layer SL should exhibit a relatively high reflectivity to the servo beam and a relatively low reflectivity to the data beam.

The data beam and the servo beam are not particularly limited for their wavelength. However, difference in the wavelength of these beams is preferably 50 to 700 nm, and more preferably 100 to 400 nm. When the wavelength difference is too small, the filter layer will be required to have steep spectral absorption characteristics and selection of the material used for the filter layer will be difficult. When the wavelength difference is too large, difficulty is encountered in increasing the recording density of the entire medium or in obtaining sufficient servo accuracy.

The wavelength region wherein the data beam and the servo beam are present is preferably the wavelength region of 300 to 1000 nm, and more preferably 400 to 800 nm. A semiconductor laser oscillating a laser beam having a wavelength shorter than such range is associated with difficulty in availability while use of a laser beam having a wavelength longer than such range is associated with difficulty in high density recording as well as difficulty in the reading of the information recorded at a high density.

Transparent Layer

The transparent layer preferably comprises a material which exhibits high transmittance to the recording/reading beam. The material used for the transparent layer is not limited. The transparent layer, however, is preferably formed from a resin since the transparent layer should be deposited to a considerable thickness. The process used for the formation of the transparent layer is not limited. In view of the ease of forming a uniform, transparent layer in short time, the transparent layer is preferably formed from a resin, and in particular, from a UV-curable resin or other active energy beam-curable resin. Alternatively, the transparent layer may be formed from a resin sheet.

The transparent layer formed from a UV-curable resin will exhibit a relatively steep absorption in the short wavelength region due to the influence of the photoinitiator as described above in the section of the "Filter layer". In order to reliably impart the transparent layer with a sufficient transparency to the recording/reading beam in the short wavelength region, an adequate type of photoinitiator should be selected depending on the wavelength of the recording/reading beam used.

When the transparent layer is provided in contact with the substrate 2, it should be noted that the difference between the refractive index of the transparent layer and the refractive index of the substrate is up to 0.1 at the wavelength of the recording/reading beam in order to suppress the reflection at the boundary between the transparent layer and the substrate.

The transparent layer is not particularly limited for its thickness, and the thickness may be adequately determined so that the cross talk between the data layers is within acceptable limits. Typically, the transparent layer has a thickness of at least 30μ when an optical pickup of conventional type is used. An excessively thick transparent layer is likely to result in an unduly increased inconsistency in the thickness as well as increased internal stress, and such a thick transparent layer is also likely to invite increase in the total thickness of the medium. Accordingly, the transparent layer preferably has a thickness of up to 100μ.

On the other hand, when a confocal optical system is adopted, the thickness of the transparent layer is determined depending on the resolution of the confocal optical system in the depth direction so that the cross talk between the data layers is within acceptable limits. To be more specific, the preferable thickness of the transparent layer is 5μ or more when the data beam has a wavelength of about 300 to about 1000 nm although such thickness may vary with the wavelength of the data beam and the constitution of the confocal optical system. Use of a confocal optical system enables provision of a transparent layer with a reduced thickness of less than 30μ, and no problem is induced even when the thickness is reduced to 20μ or less.

When the medium has a disk shape and the transparent layer comprises a resin, the transparent layer is preferably formed by spin coating since the spin coating is a process which is capable of forming a relatively uniform transparent layer. The transparent layer formed by the spin coating process, however, suffers from the problem that the layer is thicker in the outer periphery region of the disk compared to the inner periphery region, and in other words, from the problem of inconsistent thickness in the radial direction of the disk. The number of the transparent layers increase with the number of the data layers, and such thickness inconsistency is accumulated with the increase in the number of the data layers. As a consequence, even if the data beam entered the substrate 2 in the outer periphery region of the disk at a normal direction, the data beam reflected at the surface of the data layer will not be normal to the substrate 2, and the quantity of the light returning to the optical pickup will be reduced. The medium will then exhibit different read-out outputs in the inner periphery region and in the outer periphery region.

In the case of an optical pickup equipped with a confocal optical system, a pinhole is provided in the optical system and the reading is accomplished by using the beam that had passed thorough this pinhole. Accordingly, when an optical pickup equipped with a confocal optical system is used, the tracking range of the focus servo will be narrower, and therefore, a higher thickness consistency is required for the transparent layer.

In view of such situation, difference between the maximum thickness and minimum thickness of the transparent layer between recorded information-bearing areas (area where the recording tracks are present) of two adjacent data layers or between the recorded information-bearing area of the data layer and the servo layer is preferably up to $3\mu$, and more preferably up to $2\mu$. When the thickness inconsistency of the transparent layer is within such range, the fluctuation in the read-out output will be critically reduced. Although it may be preferable that the difference between the maximum and minimum thickness of the transparent layer is reduced to the lowest possible value, reduction of such difference to zero is difficult as long as the transparent layer is formed by spin coating, and the fluctuation in the read-out output is sufficiently reduced when the thickness difference is within the above-specified range. Therefore, the thickness difference need not be reduced to less than $1\mu$. In the disk-shaped medium, the recorded information-bearing area is typically an annular area having a width of about 20 to about 50 mm.

It should be also noted that the resin layers other than the transparent layer, for example, the filter layer comprising a resin or a resin and a dye, a protective layer which is often provided on the surface of the medium, an adhesive layer, and the like may be formed by spin coating.

Servo Layer

The servo layer is a reflective layer formed on the servo substrate 20, and the servo layer is formed with the projections and depressions carrying the tracking servo information. The servo layer carries tracking servo information corresponding to the projections and depressions. Grooves and/or pits are typically used for the projections and depressions.

The reflective layer constituting the servo layer is not particularly limited for its constitution, and the reflective layer formed may be similar to those formed in conventional optical information media. The reflective layer may typically comprise a metal or semimetal such as Al, Au, Ag, Pt, Cu, Ni, Cr, Ti, or Si as a simple substance or as an alloy containing at least one of such metals and semimetals. The reflective layer is typically formed to a thickness of 10 to 300 nm. A thickness below such range is likely to result in an insufficient reflectivity while the thickness in excess of such range is not advantageous in cost since increase in the thickness does not result in significant increase of the reflectivity. The reflective layer is preferably formed by vapor deposition such as sputtering and evaporation.

Data Layer

When the present invention is applied to an optical recording medium, the data layer includes at least a recording layer comprising a recording material. The optical recording medium to which the present invention is applied is not limited particular type, and applicable media include a rewritable medium or a write once medium employing a phase change recording material, a rewritable medium employing a magnetooptical recording material, a write once medium employing an organic dye. However, use of a phase change recording material is preferable in view of high light transmittance compared to other recording materials, and accordingly, capability of increasing the number of recording layers.

The composition of the phase change recording material is not particularly limited, and the material is preferably the one containing at least Sb and Te. However, crystallization temperature of the recording layer containing Sb and Te as the only components is as low as about 130° C. and the storage reliability is insufficient, and therefore, the recording layer may preferably comprise elements other than Se and Te. Such element is preferably element M (element M is at least one element selected from In, Ag, Au, Bi, Se, Al, P, Ge, H, Si, C, V, W, Ta, Zn, Ti, Ce, Tb, Sn, Pb, Pd, and Y), and among these, the preferred is Ge in view of the high effect in improving the storage reliability.

When the atomic ratio of the elements constituting the recording layer is represented by the formula (I):

$$Sb_aTe_bM_c \qquad (I),$$

wherein a+b+c=1, and a, b, and c are preferably such that: $0.2 \leq a \leq 0.85$, $0.1 \leq b \leq 0.6$, and $0 \leq c \leq 0.25$. More preferably, $0.01 \leq c \leq 0.25$. In other words, "a" is in the range of from approximately 0.2 to approximately 0.85, while "b" is in the range of from approximately 0.1 to approximately 0.6, and "c" is in the range of from approximately 0.01 to approximately 0.25.

When the content of Sb is too low, crystallization speed will be insufficient and the overwriting will be difficult. On the other hand, when the Sb content is too high, crystallization speed will be excessively high and formation of amorphous record marks will be difficult. When the content of M is too low, the effect of M addition will be insufficient while addition of M in an excessive amount will result in insufficient alteration of the reflectivity with the phase change, and hence, in an insufficient degree of modulation. When Te content is too low, formation of record marks will be difficult due to the difficulty in amorphization. On the other hand, when the Te content is too high, crystallization speed will be insufficient and overwriting will be difficult.

A phase change recording medium is generally used as a rewritable medium. In the present invention, however, the phase change recording medium may be used as a write once medium. The "write once medium" used herein designates a medium which is recordable but wherein erasure of the once recorded record mark is not ensured, and in the case of a write once medium, overwriting of the record marks recorded in the recording track by erasing the record marks is not intended. Advantages associated with the use of a phase change recording medium for the write once medium are as described below.

In the case of a multi-layer recording medium, a plurality of recording layers are disposed one on another, and this structure is accompanied with an increased loss in the light quantity of the recording/reading beam. Therefore, use of a thinnest possible recording layer is desired. Decrease in the thickness of the recording layer, however, invites an increase in the cooling speed of the recording layer after the recording beam irradiation. Crystallization is less likely to take place at a higher cooling speed, and use of a composition which easily undergo crystallization is required to ensure the erasability. In other words, considerable increase in the crystallization speed of the recording layer will be required.

A recording layer of high crystallization speed, however, is associated with the problem of higher occurrence of the self erase as described below. In the recording, heat dissipates from the beam spot of the recording beam in the lateral direction of the recording layer, and cooling of the record marks is inhibited by this heat. When the recording layer has a high crystallization speed, the record marks are partly recrystallized due to such cooling inhibition, and the size of the record mark formed will be reduced. To be more specific, the phenomenon often encountered is erasure of the leading edge of the record mark (the part first irradiated with the beam spot) or the trailing edge of the record mark. Such phenomenon is referred in the present invention as the "self erase". The self erase is associated with decrease in the CIN or increase in the jitter.

As described above, when the thickness of the recording layer is reduced, it will be difficult to simultaneously ensure sufficient erasability and suppress the self erase. In contrast, when a medium having a phase change recording layer is used as a write once medium, there will be no need to erase the record marks, and hence, to consider the crystallization speed of the recording layer. Accordingly, no problem will be induced even if the crystallization speed of the recording layer were reduced to the level where no substantial influence on the self erase is induced. In addition, when overwriting is conducted, increase in the crystallization speed of the recording layer is required with the increase in the linear velocity of the medium in the recording, and this also invites increased likeliness of self erase. However, if the recording is conducted only once with no overwriting operation, it will be possible to conduct the recording at a high linear velocity, for example, at a linear velocity of about 10 m/s in a recording layer having a relatively slow crystallization speed with reduced likeliness of self erase, and a high data transfer rate is easily realized.

As described above, the medium of the present invention has a plurality of recording layers disposed one on another and loss of the light quantity of the recording/reading beam is thereby increased. Therefore, use of a thinnest possible recording layer is preferable with the function of the recording layer maintained. However, an excessively thin recording layer can no longer function as a recording layer, and the recording layer preferably has a thickness of 2 to 50 nm, and more preferably, 4 to 20 nm.

When a phase change recording layer is employed, the data layer may preferably have the structure as shown for DL-1 in FIG. 1. This data layer has a structure wherein the recording layer 4 is sandwiched between the first dielectric layer 31 and the second dielectric layer 32. When such structure is adopted, the recording layer and the dielectric layers are preferably formed by sputtering. The dielectric material used in the dielectric layers may be a compound containing at least one metal component selected from Si, Ge, Zn, Al, and rare earth metals, and the compound is preferably an oxide, a nitride, a sulfide, or a fluoride. A mixture containing two or more such compounds may be also used. Each dielectric layer may preferably have a thickness of 10 to 500 nm.

In the present invention, use of the recording layer with a reduced thickness is preferable in order to reduce the loss in the light quantity of the recording/reading beam. Decrease in the thickness of the phase change recording layer, however, is associated with a decrease in the degree of modulation, namely, with a decrease in the difference in reflectivity between the amorphous record mark and the crystalline region. In order to increase the degree of modulation, the dielectric layer is preferably formed as a laminate of two or more layers each having different refractive index. Such multi-layer structure also results in an increased flexibility of optical design, and increase in the light transmittance of the entire data layer can be realized. An exemplary dielectric layer of multi-layer structure is a laminate of at least one layer selected from magnesium fluoride layer, manganese fluoride layer, germanium nitride oxide layer, and silicon oxide layer with a $ZnS$-$SiO_2$ layer.

When a plurality of recording layers are formed, intensity of the recording beam reaching the particular recording layer reduces with the increase in the distance of the recording layer from the surface of the recording beam incidence into the medium. Therefore, recording sensitivity of the recording layer is preferably adjusted corresponding to the intensity of the recording beam reaching to the particular recording layer. In the case of recording materials wherein heat mode recording is conducted as in the case of phase change recording materials, increase in the thickness of the recording layer results in an increase in heat storage, and hence, in an increase in the recording sensitivity.

In view of such situation, the thickness of the recording layer remote from the surface of the recording beam incidence may be increased as required compared to the recording layer near the surface of the recording beam incidence. However, adjacent two recording layers may have an identical thickness. In addition, the recording/reading beam used in the recording layer remote from the surface of the recording beam incidence is the recording/reading beam which has passed through other recording layers, and for the purpose of leveling the reading properties of the recording layers, a recording layer near the surface of the recording beam incidence may preferably have a higher light transmittance. In consideration of such light transmittance, it is also preferable that the recording layer remote from the surface of the recording beam incidence has an increased thickness.

It should be noted that the adjustment of the recording sensitivity and the transmittance can also be accomplished through control of the composition of the recording layer. In such case, all recording layers may be formed to an identical thickness, or alternatively, control of the composition can be combined with the control of the thickness.

The present invention is also applicable to a read only medium. The data layers of such medium may comprise either a layer formed with pits carrying the recorded information or a layer of a write once medium carrying the preliminarily recorded data. In the former case, the pits are generally formed in thee transparent layer or the filter layer, and a translucent reflective layer is formed on the surface of the layer formed with the pits. The reflective layer will then serve as the data layer. Examples of such translucent reflective layers are an extremely thin metal layer and a silicon layer. In such read only medium, reflectivity of the data layer may be controlled for the leveling of the read-out signal. To be more specific, the reflectivity may be controlled such that the data layer with the smaller quantity of light reached exhibits higher reflectivity. When the reflectivity is controlled as described above, the data layer near the surface of the beam incidence will exhibit higher light transmittance and marked attenuation in the quantity of the light reaching the data layer remote from the surface of the beam incidence will be avoided.

In the present invention, number of the data layers included in the medium is not limited as long as two or more data layers are included. An excessive number of data layers, however, results in unduly increased thickness of the medium and the effect of the thickness inconsistency of the transparent layer formed by spin coating will also surpass the acceptable level. Accordingly, the number of the data layers is preferably up to 10, and more preferably up to 6.

When a plurality of information-bearing layers are disposed one on another, quantity of the light reflected from the information-bearing layer will be reduced. However, it has been found that sufficient C/N at the data layer and sufficient servo signal at the servo layer are attained when the maximum reflectivity of the information-bearing layer is 5% or less. However, sufficient C/N and servo signal strength will not be ensured when the reflectivity is excessively low, and the information-bearing layer may preferably have a maximum reflectivity of at least 0.1%.

Substrate and Servo Substrate

The substrate 2 preferably comprises a material which is substantially transparent to the recording/reading beam such as a resin or glass since the recording/reading beam is irradiated through the substrate 2. Among such materials, use of a resin is preferable in view of the handling convenience and the low price, and exemplary resins include acrylic resins, polycarbonates, epoxy resins, and polyolefins. However, when the recording/reading beam used has a wavelength as short as about 450 nm or below, a polycarbonate substrate will exhibit an excessively high absorption of the recording/reading beam, and use of a material such as an amorphous polyolefin exhibiting lower optical absorption to a short wavelength beam is preferable.

The substrate 2 is not limited for its shape and dimension. The substrate 2, however, is typically a disk having a thickness of at least $5\mu$ and preferably about $30\mu$ to 3 mm and a diameter of about 50 to 360 mm.

The servo substrate 20 shown in FIG. 1 may comprise a resin or a glass as in the case of the substrate 2. Use of a resin, however, is preferable in view of the ease of forming the servo information-carrying projections and depressions by injection molding. It should be noted that the servo substrate 20 is not necessary transparent. The servo substrate 20 is also not limited for its thickness, and an adequate thickness may be selected, for example, from the range described for the substrate 2. However, when the substrate 2 has a relatively low rigidity, the rigidity of the entire medium is preferably ensured by increasing the thickness of the servo substrate 20 to a considerable degree.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Samples of optical recording disk having the structure as shown in FIG. 1 were produced by the procedure as described below.

Four transparent layers TL-1 to TL-4 and 4 data layers DL-1 to DL-4 were alternately disposed on one surface of a substrate 2 comprising a glass disk which had been toughened on both surfaces (thickness, 1.2 mm; diameter 120 mm).

The transparent layers were formed by spin coating a UV-curable resin (SK-5110 manufactured by Sony Chemicals Corporation) at a rotation speed of 1500 rpm for 2 seconds and UV curing the coated resin. The transparent layer after the curing had a thickness of $15\mu$. It should be noted that this thickness is a value measured at the radially central position of the area where recorded information is carried (the area at a radial distance of 20 mm to 58 mm from the center of the disk).

The recording layer 4 included in each data layer had a composition (atomic ratio) of:

$Sb_{22.1}Te_{56.0}Ge_{21.9}$

The recording layers 4 were formed to a thickness of 5 nm, 5 nm, 7 nm, and 13 nm, respectively, from the side of the data beam incidence. The recording layer 4 was formed by magnetron sputtering system and the thickness was adjusted by controlling the power, pressure, and time of the sputtering.

The first dielectric layer 31 and the second dielectric layer 32 included in each data layer was adjusted to the range of 75 to 271 nm to thereby ensure absorption of the recording layer and simultaneously increase the light transmittance of the entire data layer. These dielectric layers were formed by magnetron sputtering system and the composition of the layers was ZnS (80 mole %)-$SiO_2$ (20 mole %).

In the meanwhile, a servo substrate 20 comprising a disk having a thickness of 1.2 mm and a diameter of 120 mm was prepared by injection molding a polycarbonate. This disk had a groove having a width of $0.76\mu$ and a depth of 183 nm formed therewith. On the surface of the servo substrate 20 where the groove had been formed, a gold layer was deposited as a servo layer SL to a thickness of 100 nm by sputtering. On the surface of this reflective layer was formed a filter layer FL, and the filter layer FL was formed by spin coating a mixture (dye content, 3 mass %) of a phthalocyanine dye (Blue-N manufactured by Nippon Kayaku Co., Ltd.) and a UV-curable resin at a rotation speed of 2500 rpm for 5 seconds and UV curing the layer. The filter layer FL after curing had a thickness of $11\mu$. The filter layer FL exhibited an absorption of 95% at a wavelength of 660 nm, and 8% at a wavelength of 780 nm. It should be noted that the absorption is a value evaluated by forming the filter layer alone on a transparent plate, and conducting the evaluation for this sample.

Next, UV-curable resin (DVD-003 manufactured by Nippon Kayaku Co., Ltd.) was dripped on the top surface of the laminate including the substrate 2 (surface of the uppermost data layer DL-4 ), and the laminate including the servo substrate 20 was aligned on the laminate including the substrate 2. The laminates were rotated at 5000 rpm for 2 seconds, and the UV-curable resin was cured by UV irradiation through the substrate 2 to thereby adhere the laminate including the substrate 2 and the laminate including the servo substrate 20 by an intervening transparent layer TL-5 of $35\mu$ thick. A sample of the optical recording disk having the structure shown in FIG. 1 was thereby produced.

The recording layers of this sample were initialized (crystallized) with a bulk eraser. The data layers and the servo layer were evaluated for their maximum reflectivity at a wavelength of 660 nm, with reflectivities of: DL-1: 1.1%; DL-2: 0.7%; DL-3: 0.9%; DL-4: 0.5%; and SL: 0.05%.

Bit Contrast

The recording layers of this sample were initialized (crystallized) with a bulk eraser, and the sample was recorded by irradiating the sample with a recording data beam having a wavelength of 660 nm and a pulse width of 50 ns through the substrate 2 with the sample in stationary state, and the bit contrast of each layer was measure by irradiating the reading data beam having the same wavelength. An optical pickup having a confocal optical system was used for the irradiation of the data beam and the detection of the reflected light. The objective lens of the optical pickup had a numerical aperture of 0.52. The results are shown in Table 1. The bit contrast shown in Table 1 is $(R_0 - R_1)/R_0$ wherein $R_0$ is the reflectivity before recording and $R_1$ is a reflectivity after recording. The minimum power $P_{min}$ shown in Table 1 is the minimum power of the recording data beam at which the contrast was found.

TABLE 1

| Data layer | Pmin (mW) | Bit contrast (%) |
| --- | --- | --- |
| DL-1 | 14 | 36 |
| DL-2 | 17 | 27 |
| DL-3 | 17 | 23 |
| DL-4 | 15 | 47 |

The results shown in Table 1 reveal that the bit contrast produced was sufficient in all of the four data layers. It was also revealed that the difference in the recording sensitivity between the data layers was small.

C/N (Carrier to Noise Ratio)

The sample was rotated, and single signal comprising pulses of the same length continuing at a constant interval was recorded in the data layers of the sample, and the recorded signal was read to measure the C/N. The recorded pulses were at a duty ratio of 50%. A data beam having a wavelength of 660 nm was used for the recording and the reading. In the recording and the reading, tracking servo was also conducted by reading the servo layer SL with a servo beam having a wavelength of 780 nm.

The results are shown in Table 2. The recording density shown in Table 2 is the value determined by converting the mark length of the single signal as described above to the bit linear density of the 1–7 modulation signal containing the signal of the same mark length as its minimum signal. In the measurement, the disk was rotated at a rotation speed of 2000 rpm (CAV), and the recording density was changed by changing the frequency of the single signal as described above. It should be noted that the recording track measured was at a radial position measured from the sample center of 42.5 mm, and the linear velocity was about 8.9 m/s.

TABLE 2

| Data layer | C/N at 53.3 kBPI (dB) | C/N at 80.0 kBPI (dB) |
| --- | --- | --- |
| DL-1 | 45.7 | 42.6 |
| DL-2 | 42.5 | 39.2 |
| DL-3 | 50.8 | 44.0 |
| DL-4 | 45.8 | 43.1 |

The results shown in Table 2 reveal that the C/N was sufficiently high in the high density recording at 80 kBPI.

Bit Error Rate

The sample was recorded with a random signal of 1–7 modulation (marklength, 2T to 8T), and the signal was read to measure the bit error rate(BER). The results are shown in Table 3.

TABLE 3

| Data layer | BER at 84.0 kBPI |
| --- | --- |
| DL-1 | $2.0 \times 10^{-5}$ |
| DL-2 | $3.5 \times 10^{-5}$ |
| DL-3 | $1.0 \times 10^{-7}$ |
| DL-4 | $1.0 \times 10^{-7}$ |

The results shown in Table 3 reveal that the bit error rate was sufficiently low in the high density recording at 84 kBPI.

Example 2

Samples of optical recording disk were produced by repeating the procedure of Example 1 except that the filter layer FL was formed by the procedure as described below.

The filter layer FL of this sample was formed by spin coating a mixture (dye content, 3 mass %) of a yellow dye (Yellow-2G manufactured by Nippon Kayaku Co., Ltd.) and a UV-curable resin at a rotation speed of 2500 rpm for 5 seconds and UV curing the resin. The filter layer FL after curing had a thickness of $10\mu$. The filter layer FL exhibited an absorption of 95% at a wavelength of 405 nm, and 7% at a wavelength of 650 nm. It should be noted that the absorption was measured by repeating the procedure of Example 1.

The sample was evaluated for its recording/reading properties by repeating the procedure of Example 1 except for the wavelength of the data beam and the servo beam which were 405 nm and 650 nm, respectively. The properties were sufficient as in the case of Example 1.

Example 3

Samples of optical recording disk were produced by repeating the procedure of Example 1 except that the filter layer FL was formed by the procedure as described below.

The filter layer FL of this sample was formed by spin coating a UV-curable resin admixed with 3 mass % of Irgacure 819 (a photoinitiator, manufactured by Ciba Specialty Chemicals Corporation) at a rotation speed of 2500 rpm for 5 seconds and UV curing the resin. The filter layer FL after curing had a thickness of $10\mu$. The filter layer FL exhibited an absorption of 93% at a wavelength of 405 nm, and 5% at a wavelength of 650 nm. It should be noted that the absorption was measured by repeating the procedure of Example 1.

The sample was evaluated for its recording/reading properties by repeating the procedure of Example 1 except for the wavelength of the data beam and the servo beam which were 405 nm and 650 nm, respectively. The properties were sufficient as in the case of Example 1.

Thus, in the present invention, the data layers are separately formed from the servo layer, and there is no need to form the tracking servo pattern on each data layer. Therefore, the data layer can be formed as a smooth layer, and highly accurate tracking servo is enabled with no increase in the production cost of the medium. Formation of the smooth data layer also results in the merits as described above. In the present invention, a filter layer is disposed between the data layer and the servo layer, and adverse effects on the tracking servo induced by the data beam reflected from the servo layer is thereby avoided.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. An optical information medium comprising:

at least two data layers for bearing recorded information, and a servo layer for bearing tracking servo information which is independently formed from said data layers;

wherein said medium is used with a recording or reading system wherein a data beam for recording or reading the data in the data layer and a servo beam for reading the tracking servo information in the servo layer are used, and the servo layer is read by the servo beam that had passed through the data layer; and a filter layer is disposed between the data layer and the servo layer, and said filter layer exhibits higher absorption to the data beam than to the servo beam.

2. The optical information medium of claim 1, wherein said filter layer exhibits an absorption of about 80% or more of said data beam.

3. The optical information medium of claim 1, wherein said filter layer comprises a UV-cured resin layer.

4. The optical information medium of claim 1, wherein said filter layer contains a dye.

5. An optical information medium comprising at least two data layers for bearing recorded information, and a servo layer for bearing tracking servo information which is independently formed from said data layers;

wherein said medium is used with a recording or reading system wherein a data beam for recording or reading the data in the data layer and a servo beam for reading the tracking servo information in the servo layer are used, and the servo layer is read by the servo beam that had passed through the data layer;

said servo layer exhibiting lower reflectivity to the data beam than to the servo beam; and a filter layer disposed between the data layers and the servo layer, said filter layer exhibiting higher absorption to the data beam than to the servo beam.

6. The optical information medium of claim 5, wherein said servo layer comprises a metal or a semimetal.

7. The optical information medium of claim 1, wherein said data layer is a flat layer, and said servo layer is a layer formed with surface projections and depressions for bearing the tracking servo information.

8. The optical information medium of claim 5, wherein said data layer is read by using a confocal optical system.

9. An optical data storage medium, comprising:

(a) at least two data layers, said data layers addressable by a data beam;

(b) a servo layer, said servo layer addressable by a servo beam, said data layers substantially transparent to said servo beam; and (c) a filter layer positioned between said servo layer and said data layers, said filter layer exhibiting higher absorption to said data beam than to said servo beam.

10. The optical data storage medium of claim 9, wherein said servo layer exhibits substantially lower reflectivity to said data beam than to said servo beam.

* * * * *

UNITED STATES PATENT AND TRADEMARK OFFICE
CERTIFICATE OF CORRECTION

PATENT NO.   : 6,540,397 B2
DATED        : April 1, 2003
INVENTOR(S)  : Yoshinari, Jiro et al.

It is certified that error appears in the above-identified patent and that said Letters Patent is hereby corrected as shown below:

<u>Title page,</u>
Item [73], replace the Assignee "Siro Technologies, Inc." with -- Siros Technologies, Inc. --.

Signed and Sealed this

Thirteenth Day of May, 2003

JAMES E. ROGAN
*Director of the United States Patent and Trademark Office*